United States Patent
Sutardja et al.

(10) Patent No.: US 7,715,135 B1
(45) Date of Patent: May 11, 2010

(54) METHODS, CIRCUITS, APPARATUS, AND SYSTEMS FOR READ CHANNEL SYNCHRONIZATION AND/OR FLY HEIGHT MEASUREMENT

(75) Inventors: Pantas Sutardja, Los Gatos, CA (US); Toai Doan, Santa Clara, CA (US); Zining Wu, Los Altos, CA (US); Michael Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 859 days.

(21) Appl. No.: 11/453,219

(22) Filed: Jun. 13, 2006

Related U.S. Application Data (60) Provisional application No. 60/718,944, filed on Sep. 20, 2005.

(51) Int. Cl.
*G11B 20/14* (2006.01)
(52) U.S. Cl. .............................. 360/40; 360/48; 360/75
(58) Field of Classification Search ....................... None
See application file for complete search history.

(56) References Cited

U.S. PATENT DOCUMENTS

| | | | | |
|---|---|---|---|---|
| 4,146,911 A | * | 3/1979 | Gyi et al. ...................... | 360/75 |
| 6,195,025 B1 | * | 2/2001 | Hassner et al. ................ | 341/59 |
| 6,671,110 B2 | * | 12/2003 | Baba et al. ..................... | 360/31 |
| 7,136,250 B1 | * | 11/2006 | Wu et al. ....................... | 360/75 |

* cited by examiner

*Primary Examiner*—Jason C Olson (57) ABSTRACT

Methods, circuits, and systems for processing a preamble field in a read channel (e.g., in a magnetic storage device such as a hard disk drive). The methods generally include the steps of (a) reading the preamble field, wherein the preamble field comprises a repetitive bit pattern having a logical transition every x bit periods, where x is an integer of at least 3 when d is 0 or 1, or where x is an integer of at least d+2 when d is greater than 1, and (b) processing the repetitive bit pattern. The methods may further relate to processing the preamble for synchronization with the read channel and/or for measuring the fly height of a read/write head. The invention also relates to methods of enabling read channel synchronization and/or fly height measurement. The circuitry for fly height measurement generally includes (a) reading logic configured to read a preamble field from a read channel, wherein the preamble field comprises a repetitive bit pattern, (b) determination logic configured to determine a characteristic of the repetitive bit pattern, and (c) correlation logic configured to correlate the characteristic to the fly height. The systems generally comprise those that include a circuit embodying one or more of the inventive concepts disclosed herein. The present invention advantageously provides improved resolution of signals resulting from the preamble fields and of harmonics of said signals, and enables fly height measurement and improved channel synchronization without consuming dedicated tracks, platters, etc. on a magnetic recording medium.

37 Claims, 7 Drawing Sheets

METHODS, CIRCUITS, APPARATUS, AND SYSTEMS FOR READ CHANNEL SYNCHRONIZATION AND/OR FLY HEIGHT MEASUREMENT

RELATED APPLICATIONS

This application claims the benefit of U.S. Provisional Application No. 60/718,944, filed Sep. 20, 2005, incorporated herein by reference in its entirety.

FIELD OF THE INVENTION

The present invention generally relates to the field(s) of reading recorded data and/or determining spacing between a mechanism for writing and/or reading data and a medium containing recorded data. More specifically, embodiments of the present invention pertain to methods, circuits, apparatus, and systems for processing a preamble field to synchronize a read channel and/or measure the fly height of a read/write head.

DISCUSSION OF THE BACKGROUND

Traditional magnetic recording systems use a preamble pattern for read channel synchronization, in both servo and data fields. In such traditional systems, this preamble pattern has generally consisted of successive repetitions of four NRZ bits, [0011] or [1100]. This pattern is generally referred to as the "2T" pattern, a pattern that includes a magnetic transition every two bit periods.

Figure 1A:
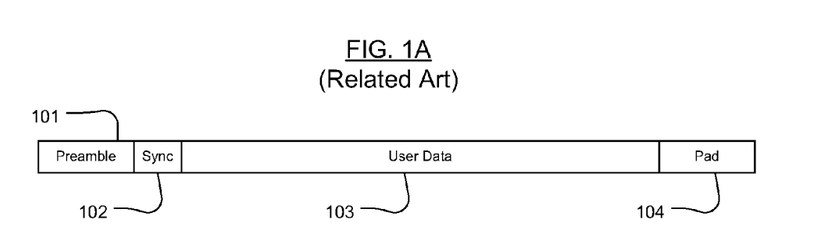
FIG. 1A is a diagram showing a conventional hard disk drive sector.

Referring now to FIG. 1A, the typical hard disk drive sector generally includes four parts: Preamble 101, Sync 102, Encoded User Data 103, and Pad 104. The preamble is typically a single frequency pattern that may be used by the reading and/or decoding circuitry (e.g., automatic gain control [AGC] and/or phase-locked loop [PLL] circuitry) to establish initial gain and timing. The detector may also use the preamble to determine a correct initial state sequence.

The preamble is typically a 2T pattern, where "T" means one channel clock period. For example, a 1 Gbps channel rate translates into ins bit intervals (channel clock periods). In this case, a 2T pattern generally has a magnetic transition every 2 ns. Because transitions alternate positive and negative, one complete period of a 2T pattern spans 4T, or 4 ns in this example. The corresponding preamble frequency is 250 MHz. The typical preamble may span from about 48 to 120 channel bits.

Figure 1B:
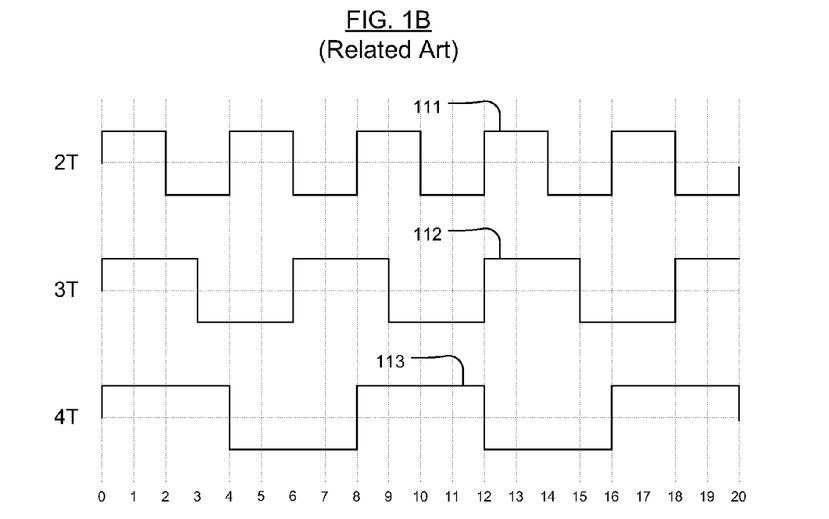
FIG. 1B is a graph showing waveforms of exemplary preamble patterns.

Referring now to FIG. 1B, exemplary repetitive preambles are shown. Waveform 111 relates to a 2T repetitive NRZ pattern. Waveform 112 relates to a 3T repetitive NRZ pattern. Waveform 113 relates to a 4T repetitive NRZ pattern. Thus waveform 111 has a transition every two bit periods, waveform 112 has a transition every three bit periods, and waveform 113 has a transition every four bit periods. Therefore, waveform 111 has a period of 4T and a frequency of ¼T, waveform 112 has a period of 6T and a frequency of ⅙T, and waveform 113 has a period of 8T and a frequency of ⅛T.

The preamble may be followed by a sync mark, signaling the end of the preamble and the beginning of the encoded user data. The sync mark may typically span 18 to 27 channel bits. The user data may comprise a 512-Byte (4096-bit) block of binary data that has been scrambled and RLL (run-length limited) encoded. A pad of from about 32 to 64 channel bits may be appended at the end of the sector to keep the data transitioning (or "clocking") through the channel and to resolve any ambiguous final code states.

Run-length limited encoding generally maps the user data into a new (and typically longer) sequence. This sequence generally follows a (d, k) run-length constraint (e.g., the encoded sequence has at least d 0s between 1 s and no more than k 0s between 1s). In conventional magnetic recording systems, (0, k) coded systems generally use a 2T preamble. In older systems, recording systems using (2, k) codes used a 3T preamble (i.e., successive repetitions of six NRZ bits, [000111] or [111000]). This was generally because the highest frequency allowed to be written by the (2, k) code was that of the 3T pattern.

As user bit density increases, the amplitude of the 2T preamble decreases with respect to the maximum amplitude in the data sector. In order to fit the full dynamic range of the signal into the quantizers without clipping, the synchronization system must therefore operate on a preamble pattern with lower amplitude and higher quantization noise. This results in a larger quantization error in the timing loop and/or gain loop in particular, and a larger synchronization error in general.

In the field of data storage media and mechanisms (e.g., hard disk drives [a type of read channel]), storage capacity must generally increase to remain competitive in the marketplace. As data storage capacity requirements increase, data bits (e.g., magnetically recorded bits) are generally packed more densely into the same recording medium dimensions to achieve higher capacity without increasing the size of the device. Therefore, it is desirable to improve the signal characteristics of the preamble pattern.

Another important parameter in the design of magnetic recording systems is the physical space between the recording head and the data recording medium (e.g., a rotating hard disk). The transducer in the head may perform both playback (read) and record (write) functions, and thus, may be known as a read/write head. The quality of recorded data bits (e.g., magnetic transitions) and the playback signal strongly depend on the clearance (or spacing) between the slider on the read/write head and the disk. This spacing is also known as flying height or the "fly height." The fly height represents a critical design trade-off. If the heads are too high above the surface of the disk the heads then data errors may occur, but if the heads are too low, the risk of a head crash dramatically increases. The fly height of the heads must be maintained within tight parameters to ensure the reliability of the drive. Hard drives conventionally use Self-Monitoring, Analysis, and Reporting Technology (SMART) as a monitoring system to detect and report on various indicators of reliability, in order to anticipate failures. One such indicator is the fly height at which the heads float over the surface of the platters. Any trend downward in fly height may indicate the possibility of a head crash in the near future.

Various factors affect the read/write head-hard disk clearance during read and write operations, and can cause modulation of (or variances within) this spacing. In a magnetic data storage system, the speed of the disk rotation, the slider air bearing design, smoothness or roughness of the recording medium surface, operating altitude and temperature are some of the key factors.

Figure 2:
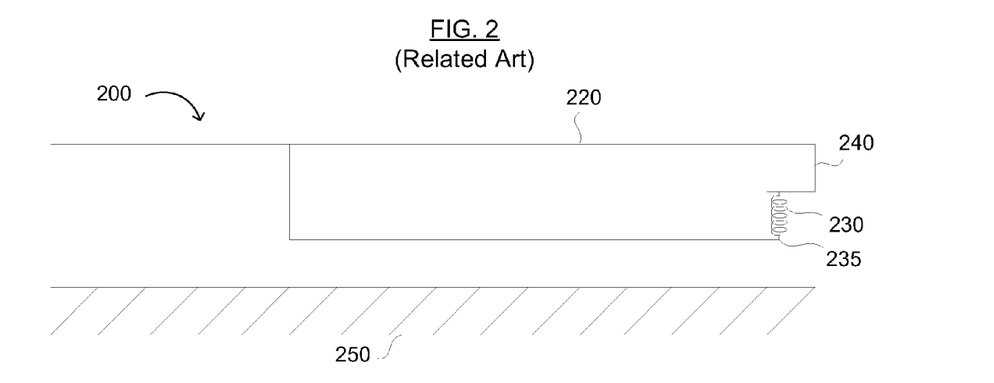
FIG. 2 is a diagram showing a conventional magnetic storage device.

FIG. 2 shows a conventional magnetic data recording and playback system 200, including read/write head 220 having write transducer (or coil) 230 and read transducer 240 electrically attached thereto. Electrical current passing through write coil 230 during a write operation generally heats the coil 230 and causes it to expand, reducing the spacing between write coil 230 and medium (or disk) 250. Protrusion of the recording element (write head) during the write process due to Joule heating and eddy-current losses may significantly reduce the flying height of sliders in hard disk drives. Such thermal expansion of the write coil 230 can also affect the position of the read transducer 240 relative to the disk 250. In some cases, the thermal expansion and contraction of the write coil 230 can be a primary factor in the variation of the fly height of the read/write head 220 and/or write coil 230.

After the recording system commands the drive servo to position the write head 220 on-track (e.g., at the beginning of a write operation) and a data read/write controller (such as a hard disk controller, or HDC) asserts a write enable signal (e.g., write gate or WG), a circuit such as a preamp sends current through the write head coil 230. The current passing through the coil 230 generates thermal power or energy, which causes the pole tip 235 to protrude towards the disk. The pole tip protrusion (PTP) generally reduces the magnetic spacing between the head and the disk 250.

On the other hand, when the write enable signal is deasserted, the current flow into or through) the write coil 230 is reduced or stopped, and the thermal energy stored in the pole tip 235 begins to dissipate into the air and the surrounding coil insulation material. The decay in thermal power (e.g., the rate of decrease in stored thermal energy in the coil 230) from the write operation causes the pole 235 tip to retract to its original position (e.g., to the original spacing). This modulation in spacing between the write head 220 or coil 230 and the data recording medium 250 can impact the data integrity and bit error rate (BER) of the drive.

One method to adjust the fly height spacing between a magnetic recording medium and the read/write head to maintain relatively constant spacing involves thermally heating the transducer region (in the write head) with a heater element. However, a need is felt for a method or technique that reliably measures fly height, while reducing or minimizing overhead in the system (e.g., additional or dedicated bits of code or circuitry, interrupts in data transmission/reception, etc.).

Needs therefore exist both to increase the accuracy and/or reliability of data reading systems (and in particular, of synchronization methods, firmware and/or hardware) to keep up with ever-increasing demands for increased data transmission speeds and data storage densities, and to measure the fly height of the read/write head(s) in such systems. It is desirable to satisfy these requirements with little or no additional disk area and/or circuitry in the read head.

SUMMARY OF THE INVENTION

Embodiments of the present invention relate to methods, circuitry, apparatus, and systems for processing a preamble field in a read channel (e.g., in a magnetic storage device such as a hard disk drive). The read channel is generally encoded according to a (d, k) run-length constraint (e.g., where d is the minimum number of 0s between two 1s in a sequence, and k is the maximum number of 0s between two 1s in a sequence). The methods generally includes the steps of (a) reading the preamble field, wherein the preamble field comprises a repetitive bit pattern having a logical transition every x bit periods, where x is an integer of at least 3 when d is 0 or 1, or where x is an integer of at least d+2 when d is greater than 1, and (b) processing the repetitive bit pattern. The methods may further relate to processing the preamble for synchronization with the read channel and/or for measuring the fly height of a read/write head.

The invention also relates to a method of enabling read channel synchronization by (a) coding a preamble field comprising a bit pattern having a logical transition every x bit periods, where x is an integer of at least 3 when d is 0 or 1, or where x is an integer of at least d+2 when d is greater than 1, and (b) recording the preamble to a storage medium.

The methods may further relate to a method of measuring fly height in a magnetic storage system. The method generally includes the steps of (a) reading a preamble field from a read channel, wherein the preamble field comprises a repetitive bit pattern wherein the pattern repeats every x' bit periods, where x' is an integer of at least four, (b) determining a characteristic of the repetitive bit pattern, and (c) correlating the characteristic to the fly height. The invention also relates to a method of enabling such fly height measurement in a magnetic storage system, including the steps of (a) coding a preamble field with a bit pattern wherein the pattern repeats every x' bit periods, where x' is an integer of at least four; and (b) recording the preamble to a storage medium.

The circuitry for measuring fly height generally includes (a) reading logic configured to read a preamble field from a read channel, wherein the preamble field comprises a repetitive bit pattern having a logical transition every x' bit periods, where x' is at least four, (b) determination logic configured to determine a characteristic of the repetitive bit pattern, and (c) correlation logic configured to correlate the characteristic to the fly height. The systems generally comprise those that include a circuit embodying one or more of the inventive concepts disclosed herein.

The present invention advantageously provides improved resolution of signals resulting from the preamble field(s) and of harmonics of those signals. The present invention thereby enables fly height measurement and improved channel synchronization without consuming dedicated tracks, platters, etc. in a magnetic recording medium.

These and other advantages of the present invention will become readily apparent from the detailed description of preferred embodiments below.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams, or waveforms within a computer, processor, controller, and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The present invention concerns methods, circuitry, apparatus, and systems for processing a preamble field in a read channel (e.g., in a magnetic storage device such as a hard disk drive). The read channel is generally encoded according to a (d, k) run-length constraint. The methods generally includes the steps of (a) reading the preamble field, wherein the preamble field comprises a repetitive bit pattern having a logical transition every x bit periods, where x is an integer of at least 3 when d is 0 or 1, or where x is an integer of at least d+2 when d is greater than 1, and (b) processing the repetitive bit pattern. The methods may further relate to processing the preamble for synchronization with the read channel and/or for measuring the fly height of a read/write head.

The invention also relates to a method of enabling read channel synchronization by (a) coding a preamble field comprising a bit pattern having a logical transition every x bit periods, where x is an integer of at least 3 when d is 0 or 1, or where x is an integer of at least d+2 when d is greater than 1, and (b) recording the preamble to a storage medium.

The methods may further relate to a method of measuring fly height in a magnetic storage system. The method generally includes the steps of (a) reading a preamble field from a read channel, wherein the preamble field comprises a repetitive bit pattern wherein the pattern repeats every x' bit periods, where x' is an integer of at least four, (b) determining a characteristic of the repetitive bit pattern, and (c) correlating the characteristic to the fly height. The invention also relates to a method of enabling fly height measurement in a magnetic storage system, including the steps of (a) coding a preamble field with a bit pattern wherein the pattern repeats every x' bit periods, where x' is an integer of at least four; and (b) recording the preamble to a storage medium.

The circuitry for measuring fly height generally includes (a) reading logic configured to read a preamble field from a read channel, wherein the preamble field comprises a repetitive bit pattern wherein the pattern repeats every x' bit periods, where x' is at least four, (b) determination logic configured to determine a characteristic of the repetitive bit pattern, and (c) correlation logic configured to correlate the characteristic to the fly height. The systems generally comprise those that include a circuit embodying one or more of the inventive concepts disclosed herein.

The invention, in its various aspects, will be explained in greater detail below with regard to exemplary embodiments.

Exemplary Methods of Processing a Read Channel and Enabling Such Processing

In one exemplary embodiment, the invention relates to method of processing a preamble field in a read channel (e.g., in a magnetic storage device such as a hard disk drive). The read channel is generally encoded according to a (d, k) run-length constraint (e.g., where d is the minimum number of 0s between two 1s in a sequence, and k is the maximum number of 0s between two 1s in a sequence). The method generally includes the steps of (a) reading the preamble field, wherein the preamble field comprises a repetitive bit pattern having a logical transition every x bit periods, where x is an integer of at least 3 when d is 0 or 1, or where x is an integer of at least d+2 when d is greater than 1, and (b) processing the repetitive bit pattern. The invention also relates to a method of enabling read channel synchronization by (a) coding a preamble field comprising a bit pattern having a logical transition every x bit periods, where x is an integer of at least 3 when d is 0 or 1, or where x is an integer of at least d+2 when d is greater than 1, and (b) recording the preamble to a storage medium.

Figure 3:
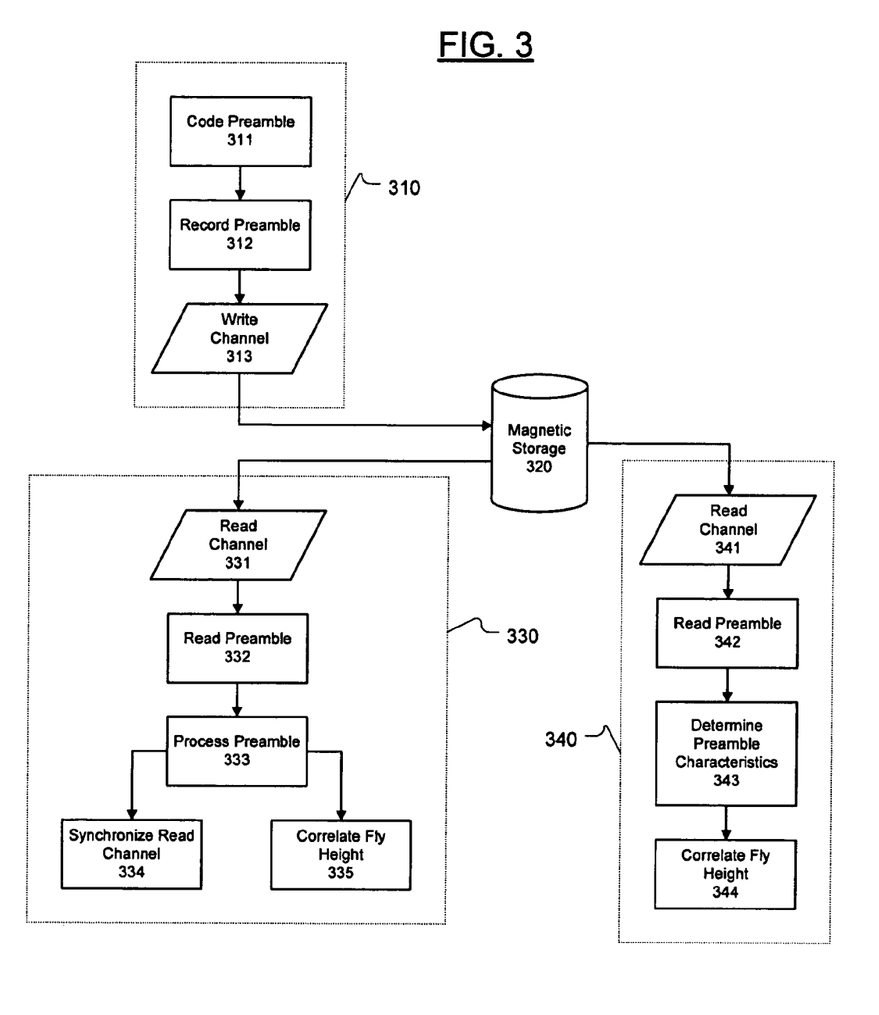
FIG. 3 is a flowchart showing exemplary methods according to the present invention.

Referring now to FIG. 3, exemplary processes according to the present invention are shown. Enabling method 310 begins with the step (311) of coding a preamble field comprising a bit pattern having a logical transition every x bit periods (e.g., where x is an integer of at least three for a (0, k) or (1, k)

encoded channel, or where x is an integer of at least d+2 for a (d, k) encoded channel where d is greater than 1). Next, the preamble may be recorded (step 312) to write channel 313 (e.g., the preamble signal may be transmitted by a read/write transducer head to magnetic storage medium 320). Processing method 330 begins with the step (332) of reading the preamble field from read channel 331 (e.g., by receiving a preamble signal from magnetic storage medium 320 via a read/write transducer head). Next, the preamble field may be processed (step 333).

In a further embodiment, the processing step may comprise synchronizing the read channel to the bit pattern. Thus, one object of the method is to use a preamble pattern for coded data with a period longer than that of the minimum period that can be coded. For example, in a magnetic data recording system, a (0, k) coded data sector conventionally uses the minimal 2T preamble pattern. Thus, according to the present invention a preamble pattern longer than the 2T pattern may be used. One such pattern with a longer period is the 4T pattern. It consists of repetitions of the NRZ bits [00001111] or [11110000]. Because it has a longer period and thus lower frequency, its response is generally higher than that of the 2T pattern, even at relatively high user bit densities. Referring again to FIG. 3, processing step 333 may include synchronization step 334.

Thus, in another embodiment, the (d, k) run-length constraint may be a (0, k) run-length constraint (i.e., d, the minimum number of 0s between two 1s in a sequence, is 0). In further embodiments, x may be 3 or 4 (e.g., the preamble may comprise 3T or 4T bit patterns, respectively).

In another embodiment, the processing step comprises correlating a characteristic of the bit pattern to the fly height. The fundamental frequency of the 2T preamble (which has a period of 4 times the bit period T) is f=¼T. It has harmonics at multiples of the fundamental frequency (e.g., at 2f, 3f, 4f, etc.). Circuits may make use of these harmonics. One such circuit is a read-head fly-height measurement circuit that uses the relative amplitudes of the fundamental f and the third harmonic 3f. The response of the 3f frequency of the 2T pattern at higher user bit density is so low that measurement of its amplitude can be adversely affected by relatively large quantization noise. Referring again to FIG. 3, processing step 333 may comprise fly height correlation step 335.

Magnetic storage media, such as hard disk drives, are typically divided into sectors, where each sector includes a preamble field and a user data field. Thus, in one embodiment the method further comprises reading a user data field in a data sector, where the data sector comprises the preamble field and the user data field.

Conventional hard disk drives often use an embedded servo (or wedge servo) configuration. Embedded servo systems generally embed feedback signals for the read/write head positioner inside gaps (wedges) in the data tracks of the disk. This configuration allows the entire set of platters to be used, instead of having to reserve one or two surfaces for the servo's use, which makes more space for data available on the drive. Thus, in another embodiment the preamble field may be in a servo wedge track.

The fundamental frequency of the 4T pattern (which has a period of 8 times the bit period) is ⅛T. Its harmonics have a higher response than those of the 2T pattern. The third harmonic of the 4T pattern can be measured with reasonably and/or relatively low quantization noise for fly-height detection. The use of a longer pattern such as 4T also allows the use of the preamble for fly-height measurement, without any additional overhead (e.g., without using additional dedicated tracks, platters, etc. in a magnetic recording medium). In this way, the preamble pattern can be used for both synchronization and fly-height measurement.

Depending on the user density and head response, other non-2T preambles may be advantageous. If user bit density is not too high, the 3T pattern may be advantageous. The 3T preamble pattern generally comprises repetitions of the NRZ bits [000111] or [111000]. The 3T preamble generally produces a signal with amplitude greater than the amplitude of a 2T preamble signal, but less than the amplitude of a 4T preamble signal. Generally, more repetitions of the 3T pattern can be written in a fixed preamble length than with the 4T pattern, thus providing more synchronization information than with the 4T pattern.

Thus, the present invention further relates to a magnetic data storage medium comprising (a) data encoded according to a (d, k) run-length constraint, and (b) a preamble field, where the preamble field comprises a bit pattern having a logical transition every x bit periods, where x is an integer of at least 3 when d is 0 or 1, or where x is an integer of at least d+2 when d is greater than 1.

In another embodiment, the (d, k) run-length constraint may be a (0, k) run-length constraint (i.e., d, the minimum number of 0s between two 1s in a sequence, is 0). In further embodiments, x may be 3 or 4 (e.g., the preamble may comprise 3T or 4T bit patterns, respectively).

In one specific implementation, the magnetic medium may further compare at least one data sector comprising the preamble field and a user data field. In another embodiment, the magnetic medium may comprise at least one servo wedge track that includes the preamble field.

Exemplary Methods of Measuring Fly Height in Data Reading Systems and Enabling Such Fly Height Measurement In another exemplary embodiment, the invention relates to a method of measuring fly height in a magnetic storage system. The method generally includes the steps of (a) reading a preamble field from a read channel, wherein the preamble field comprises a repetitive bit pattern wherein the pattern repeats every x' bit periods, where x' is an integer of at least four, (b) determining a characteristic of the repetitive bit pattern, and (c) correlating the characteristic to the fly height. The invention also relates to a method of enabling such fly height measurement in a magnetic storage system, including the steps of (a) coding a preamble field with a bit pattern wherein the pattern repeats every x' bit periods, where x' is an integer of at least four; and (b) recording the preamble to a storage medium. The method of enabling may further include the step of transmitting the preamble to a write channel.

Referring again to FIG. 3, exemplary process 340 shows a method for measuring fly height in a magnetic storage system. Process 340 may begin begins with the step (342) of reading the preamble field from read channel 3411 (e.g., by receiving a preamble signal from storage medium 320 via a read/write transducer head). Next, the process may include the step 343 of determining one or more characteristics and/or parameters of the preamble (e.g., the frequency of the preamble, the amplitude of the preamble signal, the amplitude of a harmonic of the preamble signal [e.g., the third harmonic of the preamble signal], etc.). Finally, the process may include the step 344 of correlating the characteristics and/or parameters with the fly height (e.g., by comparing the amplitude of the preamble signal with the amplitude of a harmonic of the preamble signal).

The repetitive preamble pattern may have a logical transition every x'/2 bit periods. Thus, the pattern itself may have exactly one logical transition. For example the pattern may comprise a 3T (e.g., "000111") or 4T (e.g., "00001111")

pattern. Alternatively, the pattern may have more than one logical transition (e.g., "101100"). The repetitive preamble pattern generally has a pattern frequency of 1/x' (e.g., the frequency of a 2T pattern is ¼T, the frequency of a 3T pattern is ⅙T, the frequency of a 4T pattern is ⅛T, the frequency of a "101100" pattern is ⅙T, etc.). In one exemplary embodiment of the method for measuring fly height, the correlating step may comprise comparing amplitude of the pattern frequency to amplitude of a harmonic of the pattern frequency. In a further embodiment, the harmonic may comprise a third harmonic of the pattern frequency. Patterns with more than one transition (e.g., "101100") generally have more harmonics in the frequency domain, which can help to detect fly height when measuring more than one of the harmonics (e.g., when measuring all of the detectable harmonics).

In another embodiment, the preamble field may be in a servo wedge track. In a servo wedge track, the bit density is typically lower than in the user data sector mode. Thus, the response of the third harmonic is generally higher in servo mode (e.g., because the preamble has a lower frequency). Thus, a 2T preamble may also be used for fly-height measurement in the servo mode. The 2T preamble may be sampled at a higher rate than the nominal bit rate of 1/T. For example, if the 2T preamble is sampled at twice the bit rate (e.g., that is ½T), the third harmonic of the 2T pattern is in the Nyquist band of the oversampled system (e.g., the third harmonic is less than half of the sampling frequency). Thus, in another embodiment the reading step may comprise sampling the read channel at a sampling frequency, where the harmonic is less than half of the sampling frequency. The third harmonic can thereby be measured without aliasing with the fundamental frequency of the 2T pattern. Therefore, a 2T servo preamble can be used for both synchronization and fly-height measurement without any extra format loss or additional overhead (e.g., without using additional dedicated tracks, platters, etc. in a magnetic recording medium).

In another embodiment, the encoding may comprise a (0, k) run-length constraint (i.e., d, the minimum number of 0s between two 1s in a sequence, is 0). In further embodiments, x' may be 6 or 8 (e.g., the preamble may comprise 3T or 4T bit patterns, respectively, or may comprise a bit pattern with more than one transition in each pattern period).

In yet another embodiment, the preamble may be in a data sector that also includes a user data field. The sampling frequency of a data track is generally 1/T. When the preamble in the data track has a 3T repetitive pattern, the frequency of the preamble is generally ⅙T. Thus, the third harmonic of the 3T pattern is generally ½T, which is within the Nyquist band of the 1/T sampling frequency. Therefore a 3T repetitive pattern in the preamble of a data sector may be used to measure the fly height (e.g., by comparing the amplitude of the pattern frequency to the amplitude of the third harmonic of the pattern frequency).

The (magnetic) storage medium may generally be encoded according to a (d, k) run-length constraint may be a (0, k) run-length constraint (i.e., d, the minimum number of 0s between two 1s in a sequence, is 0). In further embodiments, x' may be 6 or 8 (e.g., the preamble may comprise 3T or 4T bit patterns, respectively, or may comprise a bit pattern with more than one transition in each pattern period).

Exemplary Circuits for Processing a Read Channel

In one aspect, the present invention relates to a circuit for processing a preamble field in a read channel. The read channel is generally encoded according to a (d, k) run-length constraint. The circuit generally includes (a) reading logic configured to read the preamble field, where the preamble field comprises a repetitive bit pattern having a logical transition every x bit periods, where x is an integer of at least 3 when d is 0 or 1, or where x is an integer of at least d+2 when d is greater than 1, and (b) processing logic configured to process the repetitive bit pattern. Thus, the invention further relates to a circuit comprising means for reading the preamble field, where the preamble field comprises a repetitive bit pattern having a logical transition every x bit periods, where x is an integer of at least 3 when d is 0 or 1, or where x is an integer of at least d+2 when d is greater than 1, and (b) means for processing the repetitive bit pattern.

Figure 4:
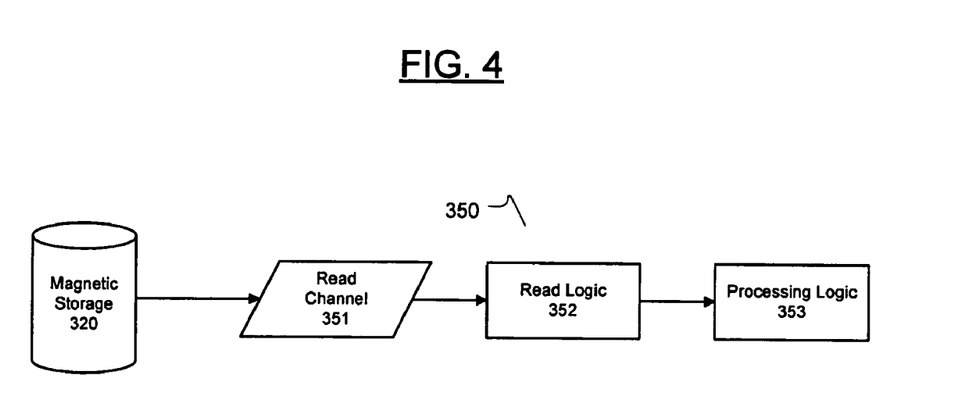
FIG. 4 is a block diagram of an exemplary circuit according to the present invention.

Referring now to FIG. 4, circuit 350 may include read logic 352, configured to read a preamble field from read channel 351 (e.g., (e.g., by receiving a preamble signal from storage medium 320 via a read/write transducer head). Circuit 350 may further include processing logic 353 configured to process the repetitive bit pattern of the preamble field.

In a preferred embodiment, the processing logic may comprise synchronization logic configured to synchronize the read channel to the bit pattern. Thus, the invention further relates to a circuit comprising means for synchronizing the read channel to the bit pattern.

In another embodiment, the processing logic may comprise correlation logic configured to correlate a characteristic of the bit pattern to a fly height of a read/write head above a storage medium. Thus, the invention further relates to a circuit comprising means for correlating a characteristic of the bit pattern to a fly height of a read/write head above a storage medium.

In another embodiment, the (d, k) run-length constraint may be a (0, k) run-length constraint (i.e., d, the minimum number of 0s between two 1s in a sequence, is 0). In further embodiments, x may be 3 or 4 (e.g., the preamble may comprise 3T or 4T bit patterns, respectively).

In one specific implementation, the preamble may be in a data sector that also contains a user data field. In another specific implementation, the preamble may be in a servo wedge track.

Exemplary Circuits for Measuring Fly Height in Data Reading Systems

In another aspect, the invention relates to a circuit for measuring fly height in a magnetic storage system. The circuit generally includes (a) reading logic configured to read a preamble field from a read channel, wherein the preamble field comprises a repetitive bit pattern wherein the pattern repeats every x' bit periods, where x' is at least four, (b) determination logic configured to determine a characteristic of the repetitive bit pattern, and (c) correlation logic configured to correlate the characteristic to the fly height. Thus, the invention further relates to a circuit comprising (a) means for reading a preamble field from a read channel, wherein the preamble field comprises a repetitive bit pattern wherein the pattern repeats every x' bit periods, where x' is at least four, (b) means for determining a characteristic of the repetitive bit pattern, and (c) means for correlating the characteristic to the fly height.

In one specific implementation, the preamble may be in a data sector that also contains a user data field. In another specific implementation, the preamble may be in a servo wedge track.

In another embodiment, the read channel may be encoded according to a (d, k) run-length constraint. The (d, k) run-length constraint may be a (0, k) run-length constraint (i.e., d, the minimum number of 0s between two 1s in a sequence, is 0). In further embodiments, x' may be 6 or 8 (e.g., the preamble may comprise 3T or 4T bit patterns, respectively, or may comprise a bit pattern with more than one transition in each pattern period).

In one exemplary embodiment, the correlation logic may be configured to compare amplitude of the pattern frequency to amplitude of a harmonic of the pattern frequency. In a further embodiment, the harmonic may comprise a third harmonic of the pattern frequency. Thus, the invention further relates to a circuit comprising means for comparing amplitude of the pattern frequency to amplitude of a harmonic of the pattern frequency.

In another embodiment, the reading logic may be further configured to sample the read channel at a sampling frequency, and wherein the harmonic is less than half of the sampling frequency (e.g., within the Nyquist band of the sampling frequency). Thus, the invention further relates to a circuit comprising means for sampling the read channel at a sampling frequency, such that the harmonic of the pattern frequency is less than half of the sampling frequency.

It is well within the abilities of one skilled in the art to design and use logic configured to perform the operations described herein.

Exemplary Hard Disk and Systems

In a further aspect of the invention, the invention relates to a hard disk drive, comprising (a) a magnetic recording medium, (b) a read/write head; and (c) a circuit as described herein configured to r process the read channel and/or measure fly height. The systems relate to those that incorporate such a hard drive, or other magnetic recording systems incorporating the circuits and/or methods of the present invention.

A further aspect of the invention concerns a network, comprising (a) a plurality of the present systems, communicatively coupled to each other; and (b) a plurality of storage or communications devices, wherein each storage or communications device is communicatively coupled to one of the systems. The network may be any kind of known network, such as a storage network (e.g., RAID array), Ethernet, or wireless network.

Figure 5A:
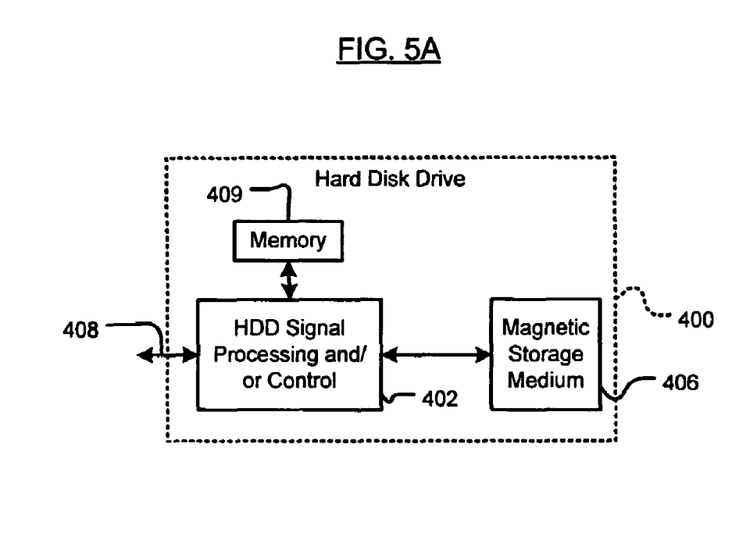
FIG. 5A is a diagram of an exemplary hard disk drive.

Various exemplary implementations of the present invention are shown in FIGS. 5A-5G. Referring now to FIG. 5A, the present invention can be implemented in a hard disk drive (HDD) 400. The present invention may implement either or both signal processing and/or control circuits, which are generally identified in FIG. 5A at 402. In some implementations, the signal processing and/or control circuit 402 and/or other circuits (not shown) in the HDD 400 may process data, perform coding and/or encryption, perform calculations, and/or format data that is output to and/or received from a (magnetic) storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM), and/or other suitable electronic data storage.

Figure 5B:
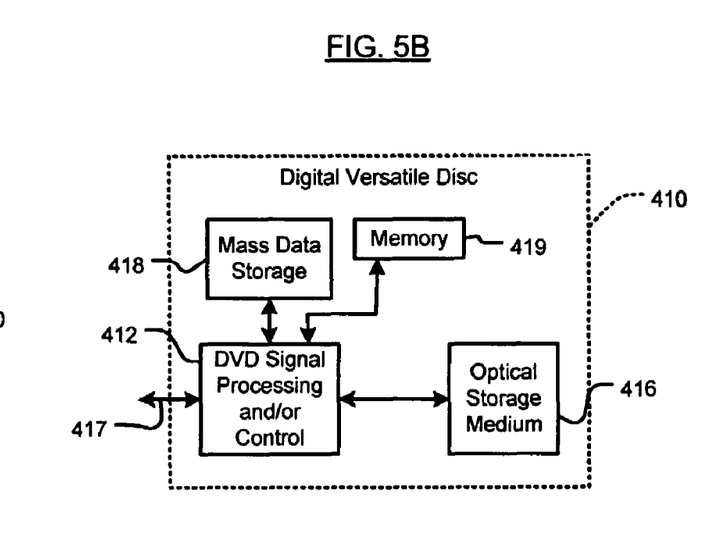
FIG. 5B is a diagram of an exemplary digital versatile disc (DVD) player.

Referring now to FIG. 5B, the present invention can be implemented in a digital versatile disc (DVD) drive 410. The present invention may implement mass data storage of the DVD drive 410. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 5A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 5C:
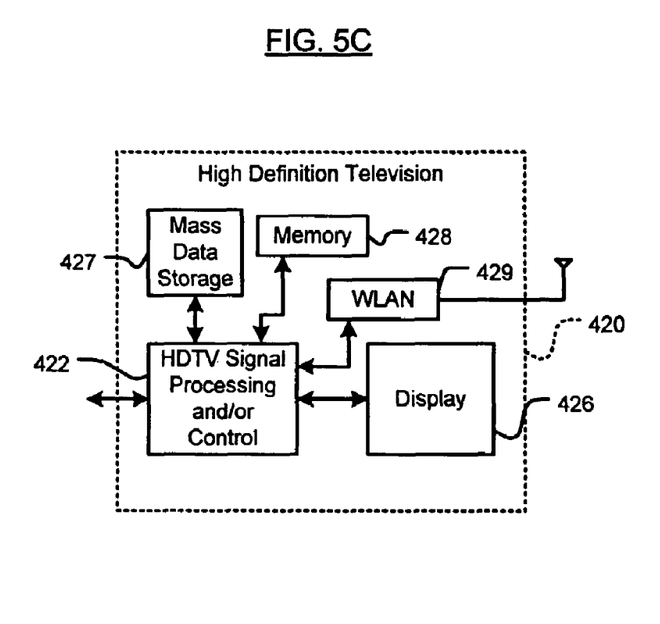
FIG. 5C is a diagram of an exemplary high definition television (HDTV).

Referring now to FIG. 5C, the present invention can be implemented in a high definition television (HDTV) 420. The present invention may implement mass data storage of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 5A and/or at least one DVD may have the configuration shown in FIG. 5B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 5D:
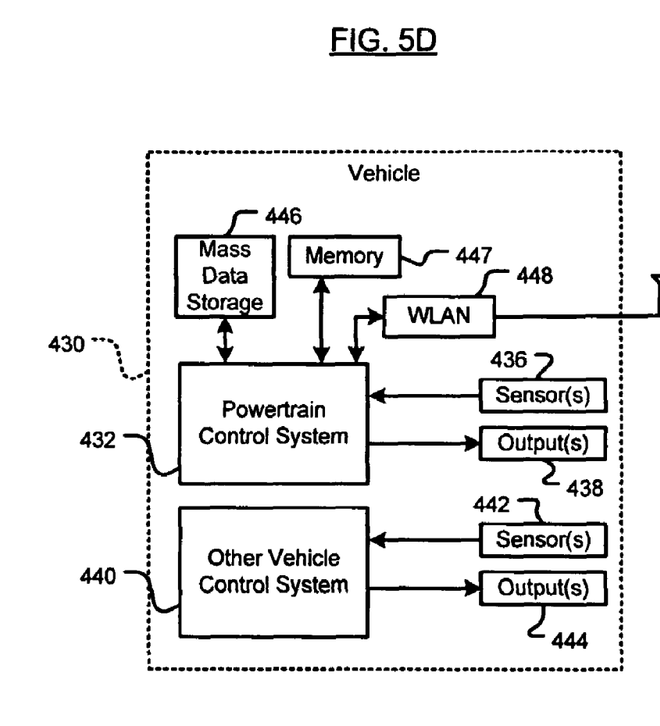
FIG. 5D is a diagram of an exemplary vehicle control system.

Referring now to FIG. 5D, the present invention implements mass data storage of the vehicle control system. In some implementations, the present invention may implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices (for example, hard disk drives [HDDs] and/or DVDs). At least one HDD may have the configuration shown in FIG. 5A and/or at least one DVD may have the configuration shown in FIG. 5B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 5E:
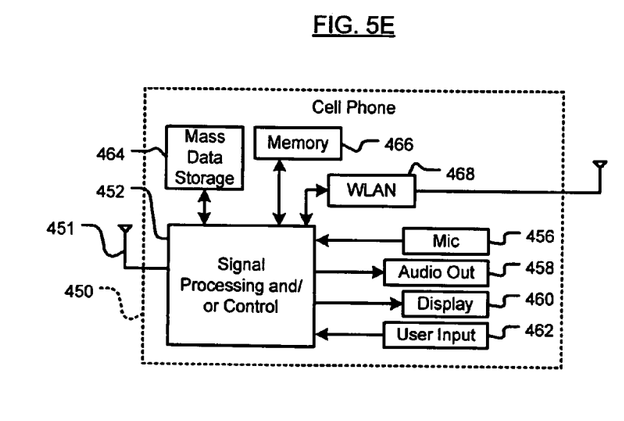
FIG. 5E is a diagram of an exemplary cellular or mobile phone.

Referring now to FIG. 5E, the present invention can be implemented in a cellular phone 450 that may include a cellular antenna 451. The present invention may implement mass data storage of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices (for example, hard disk drives [HDDs] and/or DVDs). At least one HDD may have the configuration shown in FIG. 5A and/or at least one DVD may have the configuration shown in FIG. 5B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 5F:
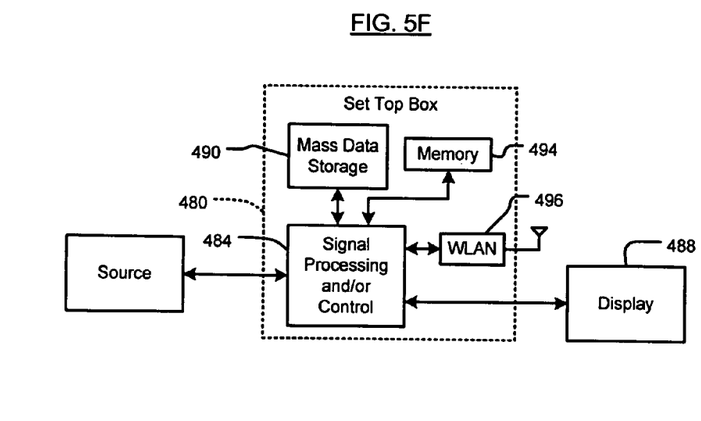
FIG. 5F is a diagram of an exemplary television set top box.

Referring now to FIG. 5F, the present invention can be implemented in a set top box 480. The present invention may implement mass data storage of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices (for example, hard disk drives [HDDs] and/or DVDs). At least one HDD may have the configuration shown in FIG. 5A and/or at least one DVD may have the configuration shown in FIG. 5B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 5G:
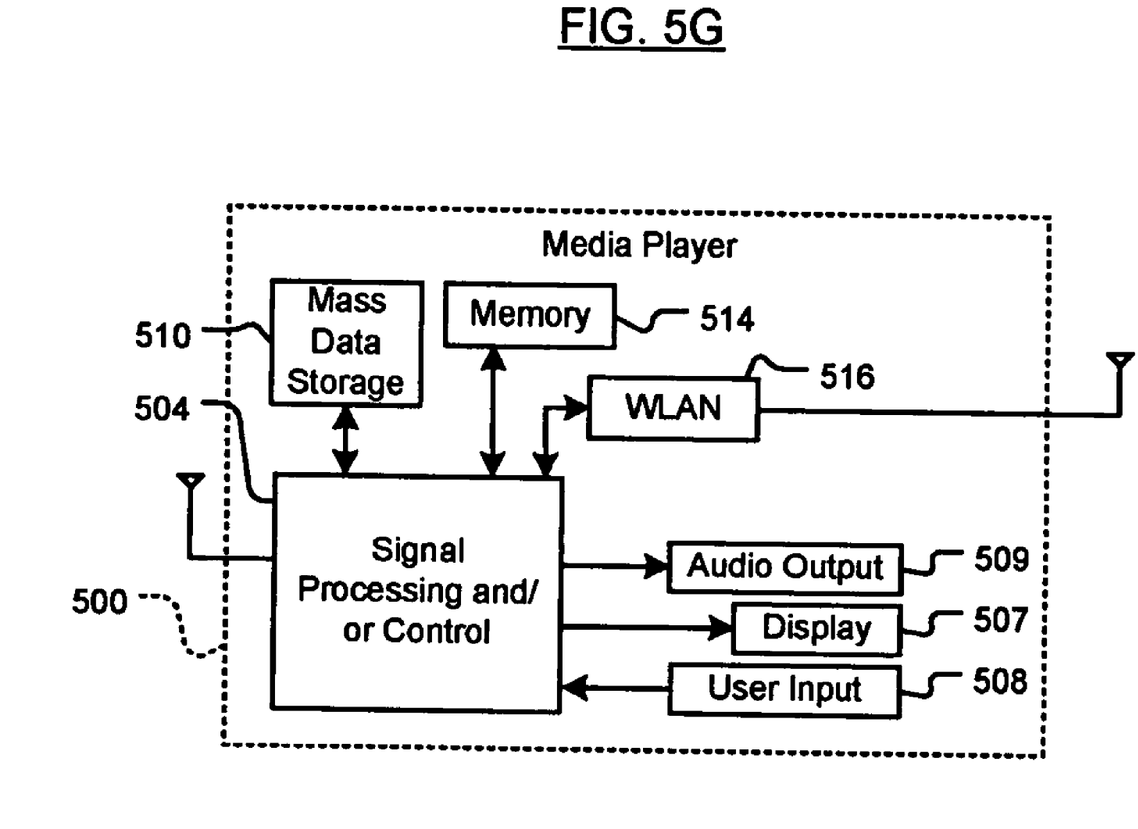
FIG. 5G is a diagram of an exemplary portable media player.

Referring now to FIG. 5F, the present invention can be implemented in a media player 500. The present invention may implement mass data storage of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices (for example, hard disk drives [HDDs] and/or DVDs). At least one HDD may have the configuration shown in FIG. 5A and/or at least one DVD may have the configuration shown in FIG. 5B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

CONCLUSION/SUMMARY

Thus, the present invention provides methods, circuitry, apparatus, and systems for processing a preamble field in a read channel. The processing may include synchronization with the read channel and/or fly height measurement. The present invention advantageously provides improved resolution of signals resulting from the preamble field(s) and of harmonics of those signals, and thereby enables fly height measurement and improved channel synchronization without consuming dedicated tracks, platters, etc. on a magnetic recording medium.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of processing a preamble field in a read channel, wherein said read channel is encoded according to a (d, k) run-length constraint, said method comprising:

reading said preamble field, wherein said preamble field comprises a repetitive bit pattern having a logical transition every x bit periods, where x is an integer of at least 3 when d is 0 or 1, or where x is an integer of at least d+2 when d is greater than 1; and processing said repetitive bit pattern.

2. The method of claim 1, wherein said processing step comprises synchronizing said read channel to said bit pattern.

3. The method of claim 1, wherein said processing step comprises correlating a characteristic of said bit pattern to said fly height.

4. The method of claim 1, wherein d is 0.

5. The method of claim 1, wherein x is 4.

6. The method of claim 1, further comprising reading a user data field in a data sector comprising said preamble field and said user data field.

7. A magnetic data storage medium comprising
data encoded according to a (d, k) run-length constraint; and
a preamble field, said preamble field comprising a bit pattern having a logical transition every x bit periods, where x is an integer of at least 3 when d is 0 or 1, or where x is an integer of at least d+2 when d is greater than 1.

8. The magnetic medium of claim 7, wherein d is 0.

9. The magnetic medium of claim 8 wherein x is 4.

10. The magnetic medium of claim 7, further comprising at least one data sector comprising said preamble field and a user data field.

11. The magnetic medium of claim 7, further comprising at least one servo wedge track comprising said preamble field.

12. A method of measuring fly height in a magnetic storage system, said method comprising:
reading a preamble field from a read channel, wherein said read channel is encoded according to a (0, k) run-length constraint and said preamble field comprises a repetitive bit pattern wherein said pattern repeats every x' bit periods, where x' is an integer of at least four;
determining a characteristic of said repetitive bit pattern; and
correlating said characteristic to said fly height.

13. The method of claim 12, further comprising reading said preamble field from a servo wedge track.

14. The method of claim 12, wherein said pattern has a pattern frequency of 1/x', and said correlating step comprises comparing an amplitude of said pattern frequency to an amplitude of a harmonic of said pattern frequency.

15. The method of claim 14, wherein said harmonic comprises a third harmonic of said frequency.

16. The method of claim 14, wherein said reading step comprises sampling said read channel at a sampling frequency, and wherein said harmonic is less than half of said sampling frequency.

17. The method of claim 12, wherein x' is 8, and said pattern comprises a logical transition every four bit periods.

18. The method of claim 12, wherein said pattern comprises more than one logical transition.

19. A method of enabling read channel synchronization in a magnetic storage system, wherein said read channel is encoded according to a (d, k) run-length constraint, said method comprising:
coding a preamble field comprising a bit pattern having a logical transition every x bit periods, where x is an integer of at least 3 when d is 0 or 1, or where x is an integer of at least d+2 when d is greater than 1; and
recording said preamble to a storage medium.

20. The method of claim 19, wherein said magnetic storage medium comprises at least one data sector comprising said preamble field and a user data field, and said method further comprises recording said user data field.

21. The method of claim 19, wherein d is 0.

22. The method of claim 21, wherein x is 4.

23. A method of enabling fly height measurement, said method comprising:
coding a preamble field for recording to a storage media, wherein said storage media is encoded according to a (0, k) run-length constraint and said preamble field comprises a bit pattern that repeats every x' bit periods, where x' is an integer of at least four; and
recording said preamble to the storage medium.

24. The method of claim 23, wherein said storage medium comprises at least one data sector comprising said preamble field and a user data field, and said method further comprises recording said user data field.

25. The method of claim 23, wherein said storage medium comprises a magnetic storage medium comprising at least one servo wedge track comprising said preamble field.

26. A circuit for processing a preamble field in a read channel, wherein said read channel is encoded according to a (d, k) run-length constraint, said circuit comprising:
reading logic configured to read said preamble field, wherein said preamble field comprises a repetitive bit pattern having a logical transition every x bit periods, where x is an integer of at least 3 when d is 0 or 1, or where x is an integer of at least d+2 when d is greater than 1; and
processing logic configured to process said repetitive bit pattern.

27. The circuit of claim 26, wherein said processing logic comprises synchronization logic configured to synchronize said read channel to said bit pattern.

28. The circuit of claim 26, wherein said processing logic comprises correlation logic configured to correlate a characteristic of said bit pattern to a fly height of a read/write head above a storage medium.

29. The circuit of claim 26, wherein said encoding comprises a (0, k) run-length constraint.

30. The circuit of claim 26, wherein said preamble is in a data sector comprising said preamble field and a user data field.

31. A circuit for measuring fly height in a storage system, said circuit comprising:
reading logic configured to read a preamble field from a read channel, wherein said read channel is encoded according to a (0, k) run-length constraint and said preamble field comprises a repetitive bit pattern having a logical transition every x' bit periods, where x' is at least two;
determination logic configured to determine a characteristic of said repetitive bit pattern; and
correlation logic configured to correlate said characteristic to said fly height.

32. The circuit of claim 31, wherein said preamble is in a servo wedge track.

33. The circuit of claim 31, wherein said pattern has a pattern frequency of ½x, and said correlation logic is further configured to compare an amplitude of said pattern frequency to an amplitude of a harmonic of said pattern frequency.

34. The circuit of claim 33, wherein said harmonic comprises a third harmonic of said frequency.

35. The circuit of claim 33, wherein said reading logic is further configured to sample said read channel at a sampling frequency, and wherein said harmonic is less than half of said sampling frequency.

36. A storage device comprising:
a recording medium;
a read/write head; and
the circuit of claim 29.

37. The storage device of claim 36, further comprising a fly height actuator configured to adjust a fly height of said read/write head.

* * * * *